Figure 1:
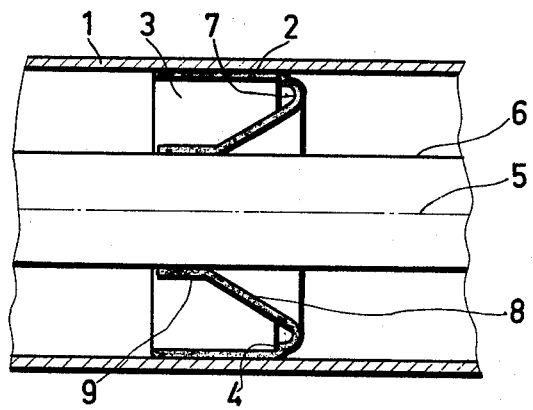

United States Patent [19]
Gretener

[11] 3,884,428
[45] May 20, 1975

[54] SPINDLE GUIDE FOR A DRAWTWISTING TUBE
[75] Inventor: Albert Gretener, Zug, Switzerland
[73] Assignee: Gretener AG, Cham, Switzerland
[22] Filed: Jan. 17, 1973
[21] Appl. No.: 324,353

[30] Foreign Application Priority Data
Jan. 18, 1972 Switzerland.......................... 684/72

[52] U.S. Cl............................. 242/118.3; 242/46.21
[51] Int. Cl............................................. B65h 75/10
[58] Field of Search....... 242/118.3, 118.31, 118.32, 242/46.21, 46.2

[56] References Cited
UNITED STATES PATENTS
2,377,920  6/1945  Atwood ........................ 242/118.31
3,402,902  9/1968  Schmidt......................... 242/118.31

Primary Examiner—Stanley N. Gilreath
Attorney, Agent, or Firm—Kenyon & Kenyon Reilly Carr & Chapin

[57] ABSTRACT

The spindle guide is formed with a tube guide portion, spindle guide portion and a funnel portion between the two guide portions. In order to insure precise insertion into a drawtwisting tube the funnel portion is connected to the tube guide portion by a radially directed ring portion. The ring portion provides a flat surface for an insertion pin to apply the necessary insertion forces.

3 Claims, 2 Drawing Figures

SPINDLE GUIDE FOR A DRAWTWISTING TUBE

This invention relates to a spindle guide for a drawtwisting tube.

Heretofore, various types of spindle guides have been known for mounting spindles within drawtwisting tubes. For example, such spindle guides have had a cylindrical tube guide portion which merges into a funnel portion directed into the tube guide portion and a substantially cylindrical spindle guide portion adjacent to the funnel portion. Generally, the funnel portion has merged into the guide tube portion on a relatively large radius. Usually, such spindle guides are stamped i.e. deep drawn from one piece of sheetmetal and the radius is formed as the funnel portion is stamped.

In manufacturing drawtwisting tubes, i.e., in mounting the individual parts which form a drawtwisting tube, the spindle guide is usually slidingly inserted into a tube member of a drawtwisting tube. Insertion is effected by placing the spindle guide over a pin of ring-shaped cross-section which has an annularly shaped tip which is provided with a radius. The radius of the spindle guide within the funnel portion is thereby able to contact the radius of the annularly shaped pin tip so that the spindle guide can be inserted into the tube member by the pin. The radius of the pintip, as a rule, is kept somewhat smaller than the radius of the spindle guide. Securement of the spindle guide in the tube member is effected by friction merely. Thus, a corresponding sliding friction resistance must be overcome as the spindle guide is inserted.

A disadvantage of a spindle guide of this type resides in the fact that the final position of the spindle guide in the tube member has not been precise due to an unprecise contact of the two radii, caused by tolerances, while the spindle guide is inserted. As a result the dynamic balance of the complete drawtwisting tube has been adversely affected.

Accordingly, it is an object of the invention to ensure a precise fitting of a spindle guide in a drawtwisting tube.

It is another object of the invention to obtain a precise setting of a spindle guide in a tube even where high resistance is to be overcome in setting the guide within the tube.

It is another object of the invention to ensure capturing of a spindle blade in a spindle guide.

It is another object of the invention to provide a spindle guide which can be manufactured in a simple manner.

Briefly, the invention provides a spindle guide for a drawing twisting tube with an integral ring portion against which an insertion means, such as a pin, can engage to insert the guide into the tube under a uniformly imposed force while obtaining a precise setting of the guide within the tube. To this end, the spindle guide includes a cylindrical tube guide portion, an annular ring portion extending radially inwardly of the tube guide portion and a curvilinear funnel portion extending from the ring portion inwardly of the tube guide portion. This funnel portion is also directed inwardly of the tube guide portion. The tube guide portion has an internal cylindrical wall and the ring portion is disposed at a right angle to this inside wall. In addition, the funnel portion defines a recess with the interal end of the ring portion within which a similarly contoured insertion means, such as a pin, can engage.

In addition, the spindle guide includes a cylindrical spindle guide portion which extends from the funnel portion and is located within the tube guide portion, for example, concentrically of the tube guide portion.

The spindle guide is made of one-piece construction and is of a sheet metal to facilitate manufacture for example by stamping i.e. deep drawing.

Figure 2:
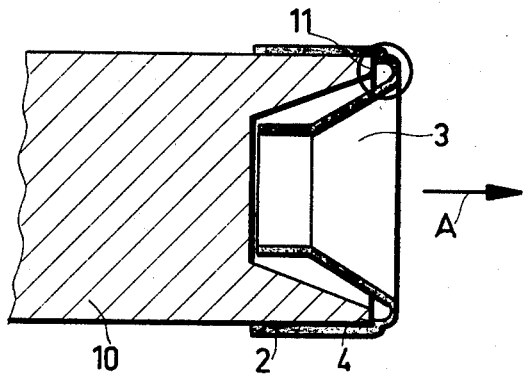

These and other objects and advantages of the invention will become more apparent from the following detailed description and appended claims taken in conjunction with the accompanying drawings in which:

FIG. 1 illustrates a longitudinal sectional view of a tube member with a spindle guide according to the invention; and FIG. 2 illustrates a longitudinal sectional view of a spindle guide placed on an insertion pin according to the invention.

Referring to FIG. 1, the one-piece spindle guide 3 is inserted into a tube member 1 of a drawtwisting tube (shown partially only) in order to mount a spindle blade 6 therein. The spindle guide 3 includes a tube guide portion 2 of hollow cylindrical shape which frictionally engages the inside surface of the tube member 1 as well as an integral ring portion 4 which extends from one end of the tube guide portion 2, e.g. at a right angle. As shown, this ring portion 4 forms practically a sharp edge with the tube guide portion 2. The ring portion 4 extends from the tube member 1 and is directed radially inwardly towards the axis 5 of the tube member 1, spindle guide 3 and spindle blade 6. The ring portion 4 defines a flat annular surface to one side as shown and merges into a funnel portion 8 at the internal end. This funnel portion 8 has a curved portion which forms a recess 7 with the internal end of the ring portion 4 and merges at the inner end into a cylindrical spindle guide portion 9. This spindle guide portion 9 is disposed concentrically within the tube guide member 1 and is in frictional engagement with the spindle blade 6 to secure the blade 6 concentrically in the tube member 1.

Referring to FIG. 2, in order to insert the spindle guide 3 into the tube member 1, the spindle guide 3 is placed onto a pin 10 connected with an inserting device (not shown). The pin 10 has a flat surface 11 which contacts the flat surface of the ring portion 4 and is inserted into the tube member 1 in the direction indicated by arrow A.

One of the advantages of a spindle guide of the invention is that the surface transmitting the inserting forces are flat. As a result, these surfaces, i.e., the ring portion 4 can be manufactured precisely in a relatively simple manner, for example, by stamping where the guide is made of sheet metal. Another advantage is that these flat surfaces which extend across the diameter of the guide practically reach the inside wall of the tube guide member 1.

The spindle guide of the invention has been found by testing to have a rejection rate of about 2% whereas similar tests on spindle guides made in accordance with U.S. Pat. No. 3,402,902 have been found to have a rejection rate of 30%. These tests were carried out on completed drawtwisting tubes and were based on the amount of out-of-roundness permissible for a spindle tube member at three different heights when mounted on an upstanding blade.

Further, because of the annular ring portion and the recess, the forces imposed on the spindle guide during insertion need only abut the ring portion without having any significant effect on the funnel portion. This can be seen in FIG. 2. That is, the forces exerted by the pin 10 will only deflect the ring portion 4 to the right as viewed. The funnel portion will have a slight distortion in the curved portion which is shown encircled in FIG. 2 while the remainder remains unchanged.

What is claimed:

1. A spindle guide of stamped sheet metal for a drawtwisting tube having a cylindrical tube guide portion, an annular ring portion defining a flat annular surface extending perpendicular to and radially inwardly of said tube guide portion at one end thereof for contacting a flat surface of an inserting pin and a funnel portion extending from said ring portion inwardly of said tube guide portion and toward the other end of said tube guide portion, said funnel portion having a smoothly curved portion connected with a radially internal end of said ring portion defining a recess, whereby the forces imposed on the spindle guide during insertion into a tube will be absored by said ring portion and said curved portion.

2. A spindle guide as set forth in claim 1 further having a cylindrical spindle guide portion extending from said funnel portion concentrically within said tube guide portion.

3. A spindle guide as set forth in claim 2 of one-piece construction.

* * * * *